Nov. 10, 1964 T. H. GALLAGHER 3,155,997
JOINTER AND RAKING TOOL
Filed July 24, 1959
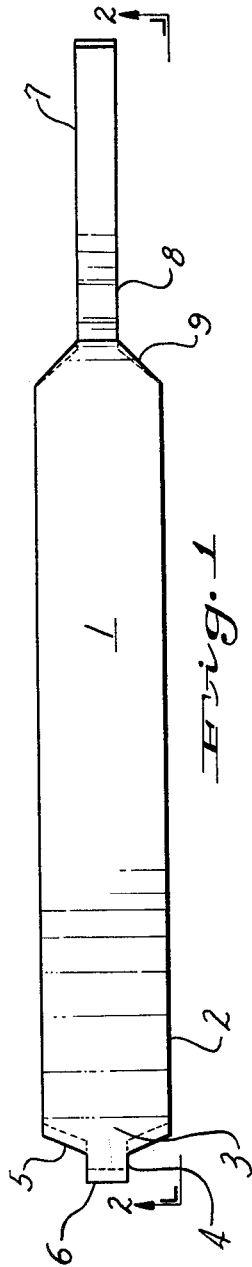
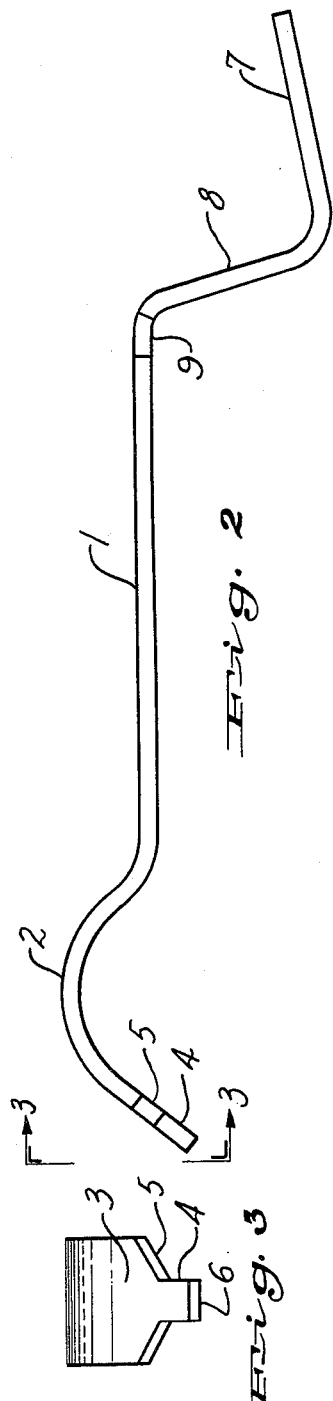
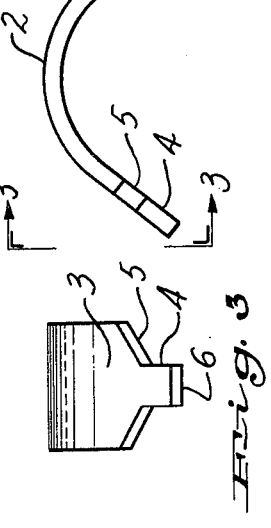
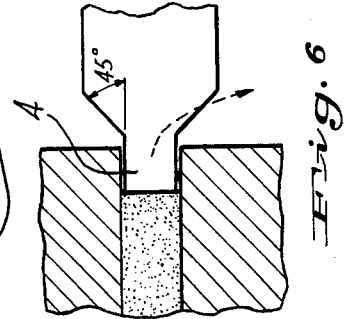
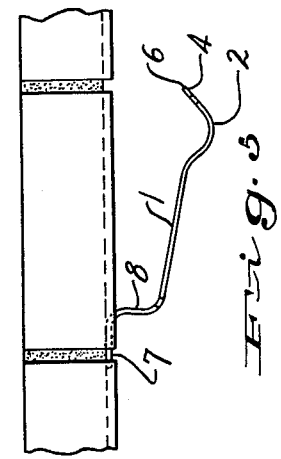
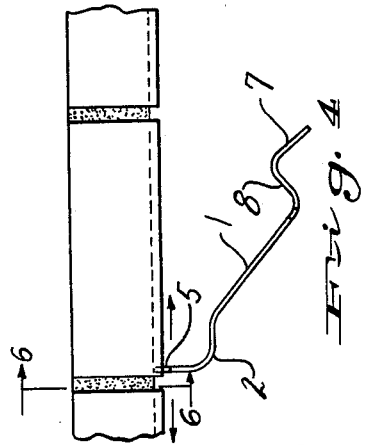
INVENTOR.
Thomas H. Gallagher
BY William B. Jaspert
Attorney.

3,155,997
JOINTER AND RAKING TOOL
Thomas H. Gallagher, 31 Willina Drive, Carnegie, Pa.
Filed July 24, 1959, Ser. No. 829,389
1 Claim. (Cl. 15—105.5)

This invention relates to new and useful improvements in masonry tools and it is among the objects thereof to provide a combination rake and smoothing tool for the mortar joints of masonry work which is especially adapted to expedite the work and to produce a smooth and sharp mortar joint.

Tools for raking and smoothing mortar joints as heretofore employed, did not have the proper angle either on the raking surface or on the smoothing surface and neither did the rake and smoothing portions of the tool have the proper angle in relation to the handle portion to avoid injury to the workman's hand in the application of the tool to the work.

The invention will become more apparent from a consideration of the accompanying drawing constituting a part hereof in which like reference characters designate like parts and in which:

FIGURE 1 is a top plan view of a combined rake and smoothing tool embodying the principles of this invention;

FIGURE 2, a side elevational view thereof taken along the line 2—2 of FIGURE 1;

FIGURE 3, an end elevational view taken along the line 3—3, FIGURE 2;

FIGURE 4, a top plan view of a row of masonry diagrammatically illustrating the use of the tool for raking mortar joints;

FIGURE 5 a similar view illustrating the application of the tool for smoothing the mortar joint after it has been raked; and, FIGURE 6, a cross section of a mortar joint and tool taken along the line 6—6, FIGURE 4.

In the drawing, the numeral 1 designates a straight handle portion of approximately 1" width to provide a substantial gripping surface to prevent turning of the tool in the hand. Extending at one end of the tool is a gooseneck shank 2 terminating in a rake-out end generally designated by the numeral 3, which has a tongue-like portion 4 and flared or angular shoulders 5, the shoulders 5 and the tip 6 of the rake-out end being square although they appear to be chamfered because of the curved or gooseneck shank portion which disposes the raking edges to an angular position giving the appearance of chamfering.

The shoulders 5 are ground at approximately a 45° angle to prevent scoring the face of the masonry when the tool is applied in the manner shown in FIGURES 4 and 6. The tool touches only one small point on the masonry which permits the mortar to fall completely free of the wall, thus preventing smearing of the masonry. Also, the raking point 4 is effect operates as a gauge as it makes a true edge on either stone masonry or brick and this raking point 4 of the tool gives accurate depth of rake-out along the entire wall, which provides straight and accurate lines and edges.

The width of the tongue 4 corresponds to the width of the mortar joint between rows of masonry such as brick, which varies from ⅛ to ⅝ of an inch. The opposite end of the tool is provided with a smoothing trowel portion generally designated by the numeral 7, which is offset from the straight handle portion 1 by a shank 8 that is disposed at such an angle that when the smoothing portion section is disposed in the mortar joint, as shown in FIGURE 5, the handle 1 is at a substantial angle to avoid the back of the hand contacting the face of the brick as the tool is being drawn along the mortar joint.

With reference to FIGURE 1, the smoothing portion 7 and the shank portion 8 are of the same width as the tongue portion 4 of the raking end of the tool and a shoulder 9 at a 45° angle is provided to avoid scoring of the face of the masonry.

A feature of the tool is rolling back of the shank portion 2 in the shape of a gooseneck to allow enough opening to permit mortar to fall through without smearing the face of the brick or other masonry as the mortar joint is raked out. The length of the shank 8 of the smoothing end 7 of the tool is at least 1½" to allow ample finger room and the smoothing end 7 of the tool is approximately 1½" long to accommodate vertical head joints.

By means of the above-described features of the raking and smoothing tool, the finishing of mortar joints on masonry is considerably expedited and sharp cut smooth joints are made without smearing the masonry and without injuring the workman.

Although one embodiment of the invention has been herein illustrated and described, it will be evident to those skilled in the art that various modifications may be made in the details of construction without departing from the principles herein set forth.

I claim:

In a tool for raking out and smoothing mortar joints of masonry walls, a straight handle portion of flat relatively wide strap metal of rectangular cross section having one end of gooseneck shape terminating in a relatively narrow rake-out tongue with flared shoulders formed at an angle of about 45°, the other end of the tool having a shank of the width of the rake-out tongue bent at substantially right angles to the handle portion in the same direction as the gooseneck end of the tool is bent and a trowel portion of approximately the width of the mortar joint integral with said shank extending from said shank at right angles substantially parallel to and spaced from the handle portion of the tool to dispose the handle at an angle to avoid contact of the hand with the wall.

References Cited in the file of this patent

UNITED STATES PATENTS

| 1,489,331 | Mull | Apr. 8, 1924 |
| 1,812,482 | Hill | June 30, 1931 |
| 2,239,585 | Amundsen | Apr. 22, 1941 |

FOREIGN PATENTS

| 180,668 | Canada | Nov. 27, 1917 |